United States Patent
Bryant et al.

(10) Patent No.: US 10,291,516 B2
(45) Date of Patent: May 14, 2019

(54) SYNONYMOUS LABELS

(71) Applicant: CISCO TECHNOLOGY, INC., San Jose, CA (US)

(72) Inventors: Stewart Frederick Bryant, Surrey (GB); George Swallow, Boston, MA (US); Muthurajah Sivabalan, Kanata, CA (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 15/001,528

(22) Filed: Jan. 20, 2016

(65) Prior Publication Data

US 2016/0254994 A1   Sep. 1, 2016

Related U.S. Application Data

(60) Provisional application No. 62/126,168, filed on Feb. 27, 2015.

(51) Int. Cl.
*H04L 12/723* (2013.01)
*H04L 12/26* (2006.01)

(52) U.S. Cl.
CPC ........ *H04L 45/507* (2013.01); *H04L 43/0829* (2013.01); *H04L 45/50* (2013.01)

(58) Field of Classification Search
CPC .... H04L 43/0829; H04L 45/50; H04L 45/507
See application file for complete search history.

(56) References Cited

U.S. PATENT DOCUMENTS

| | | | | |
|---|---|---|---|---|
| 7,277,386 | B1* | 10/2007 | Ferguson | H04L 45/04 370/230 |
| 7,839,847 | B2* | 11/2010 | Nadeau | H04L 45/50 370/389 |
| 7,903,565 | B2* | 3/2011 | Addeo | H04L 43/0811 370/236.2 |
| 7,948,986 | B1* | 5/2011 | Ghosh | H04L 45/50 370/392 |
| 8,953,437 | B1* | 2/2015 | Tiruveedhula | H04L 45/50 370/218 |
| 9,178,810 | B1* | 11/2015 | Singh | H04L 45/50 |
| 9,397,913 | B1* | 7/2016 | Nimmagadda | H04L 43/0835 |

(Continued)

OTHER PUBLICATIONS

EPO Jul. 14, 2016 Extended Search Report from European Application Serial No. 16154342.6; 6 pages.

(Continued)

*Primary Examiner* — Khaled M Kassim

(57) ABSTRACT

Particular embodiments described herein provide for a communication system that can be configured to identify a system that includes network traffic, where at least a portion of the network traffic includes packets, at least a portion of the packets include a stack, and at least a portion of each stack includes one or more previously allocated labels. The communication system can further be configured to determine a synonymous label that triggers an action and to replace a label from the one of the one or more previously allocated labels in a specific stack of a specific packet with the synonymous label. In an example, the synonymous label can be used to identify a subset of packets in the network traffic or a source of the specific packet.

20 Claims, 8 Drawing Sheets

(56) References Cited

U.S. PATENT DOCUMENTS

| | | | | |
|---|---|---|---|---|
| 2002/0009050 A1* | 1/2002 | Ueno | H04L 45/00 | 370/230 |
| 2002/0172155 A1* | 11/2002 | Kasvand-Harris | H04N 7/08 | 370/229 |
| 2003/0043755 A1* | 3/2003 | Mitchell | H04L 43/0894 | 370/252 |
| 2003/0110287 A1* | 6/2003 | Mattson | H04L 45/00 | 709/238 |
| 2005/0053071 A1* | 3/2005 | Betts | H04L 29/06 | 370/395.21 |
| 2005/0141531 A1* | 6/2005 | Kinoshita | H04L 29/12405 | 370/401 |
| 2006/0268853 A1* | 11/2006 | Guichard | H04L 45/10 | 370/389 |
| 2009/0144446 A1* | 6/2009 | Olakangil | H04L 63/14 | 709/239 |
| 2009/0323521 A1* | 12/2009 | Tochio | H04L 12/42 | 370/225 |
| 2011/0205907 A1* | 8/2011 | Kini, Sr. | H04L 41/06 | 370/241.1 |
| 2013/0336192 A1* | 12/2013 | Zhao | H04L 45/16 | 370/312 |
| 2013/0343204 A1* | 12/2013 | Geib | H04L 41/08 | 370/248 |
| 2014/0029622 A1* | 1/2014 | Bettink | H04L 47/10 | 370/394 |
| 2014/0078927 A1* | 3/2014 | Thubert | H04L 45/507 | 370/254 |
| 2014/0177638 A1 | 6/2014 | Bragg et al. | | |
| 2015/0222531 A1* | 8/2015 | Budhia | H04L 45/507 | 370/400 |
| 2015/0263940 A1* | 9/2015 | Kini | H04L 45/50 | 370/236.2 |

OTHER PUBLICATIONS

Frost, D., et al., "Packet Loss and Delay Measurement for MPLS Networks," Internet Engineering Task Force (IETF) RFC6374, Sep. 2011; 52 pages.

Capello, A., et al., "A packet based method for passive performance monitoring," Network Working Group Internet—Draft, draft-tempia-opsawg-p3m, Feb. 25, 2013; 22 pages.

Bryant, S., et al., "RFC6374 over UDP," MPLS Internet—Draft, draft-bryant-mpls-RFC63740-over-udp, Feb. 18, 2015; 4 pages.

Bryant, S., et al., "RFC6374 Synonymous Flow Labels," MPLS Internet Draft, draft-bryant-mpls-synonymous-flow-labels-oo, Mar. 2, 2015.

Bryant, S., et al., "A Control Protocol for Synonymous Flow Labels," MPLS Internet-Draft, draft-bryant-mpls-sfl-control-00; Mar. 2, 2015; 11 pages.

English translation of First Office Action in counterpart Chinese Application No. 201610109960.0, dated Aug. 22, 2018, 7 pages.

Examination Report in counterpart European Application No. 16154342.6, dated Dec. 12, 2018, 11 pages.

* cited by examiner

SYNONYMOUS LABELS

CROSS-REFERENCE TO RELATED APPLICATION

This application claims the benefit of priority under 35 U.S.C. § 119(e) to U.S. Provisional Application No. 62/126,168, entitled "SYNONYMOUS LABELS" filed in the U.S. Patent Office on Feb. 27, 2015, which is hereby incorporated by reference in its entirety.

TECHNICAL FIELD

This disclosure relates in general to the field of communications and, more particularly, to synonymous labels that can be used in place of previously allocated labels.

BACKGROUND

Multi-protocol label switching (MPLS) is a scalable, protocol-independent transport mechanism in networks that directs data from one network node to the next based on short path labels rather than long network addresses. To avoid complex lookups in a routing table, MPLS uses labels to make data forwarding decisions and with MPLS, a Layer 3 header analysis is done just once (when the packet enters the MPLS domain). A label inspection drives subsequent packet forwarding. MPLS provides these beneficial applications: virtual private networking (VPN), traffic engineering (TE), quality of service (QoS), and any transport over MPLS (AToM). Additionally, MPLS can decrease the forwarding overhead on the core routers. MPLS technologies are applicable to almost any network layer protocol.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

A method is provided in one example and includes identifying a system that includes network traffic, where at least a portion of the network traffic includes packets, at least a portion of the packets include a stack, and at least a portion of each stack includes one or more previously allocated labels. The method can further include determining a synonymous label that triggers an action and replacing a label from one of the one or more previously allocated labels in a specific stack of a specific packet with the synonymous label. In an example, the synonymous label may have the same semantics as the previously allocated label except the synonymous label can trigger an action that the previously allocated label would not trigger.

In one implementation, the specific stack is not further modified. In some examples, the synonymous label can identify a subset of packets in the network traffic without further modifying the specific stack. In other examples, the synonymous label can identify a source of the specific packet without further modifying the specific stack. The method can also include determining packet loss related to a subset of packets in the network traffic, where each packet in the subset of packets includes the synonymous label. In a specific example, the packet loss is determined using RFC 6374 procedures and protocol mechanisms. In an example, the method can include analyzing at least a portion of the network traffic that includes the packets to identify the synonymous label.

Example Embodiments

Figure 1:
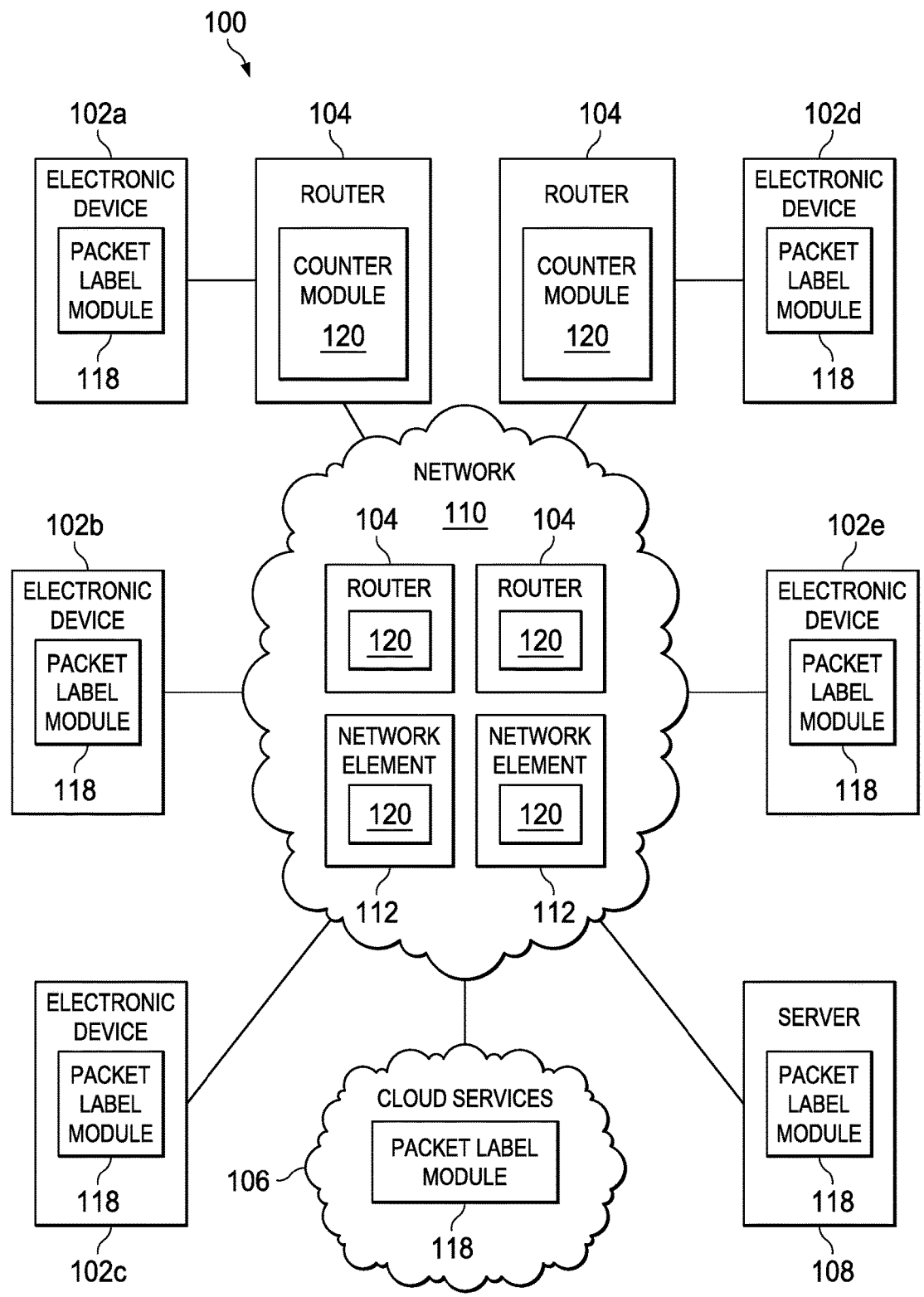
FIG. 1 is a simplified block diagram of a communication system in accordance with one embodiment of the present disclosure.

Turning to FIG. 1, FIG. 1 is a simplified block diagram of a communication system 100 for synonymous labels in accordance with one embodiment of the present disclosure. Communication system 100 can include a plurality of electronic devices 102*a*-102*e*, one or more routers 104, cloud services 106, and a server 108. In an example, communication system 100 may not include any routers 104 or one or more routers 104 may include a label switch router (LSR) or transit router. Each electronic device 102*a*-102*e*, cloud services 106, and server 108 can include a packet label module 118. Electronic devices 102*a*-102*e*, cloud services 106, and server 108 can be in communication using network 110. Network 110 can include one or more routers 104 and/or one or more network elements 112. Each router 104 and network element 112 can include a counter module 120.

Figure 2:
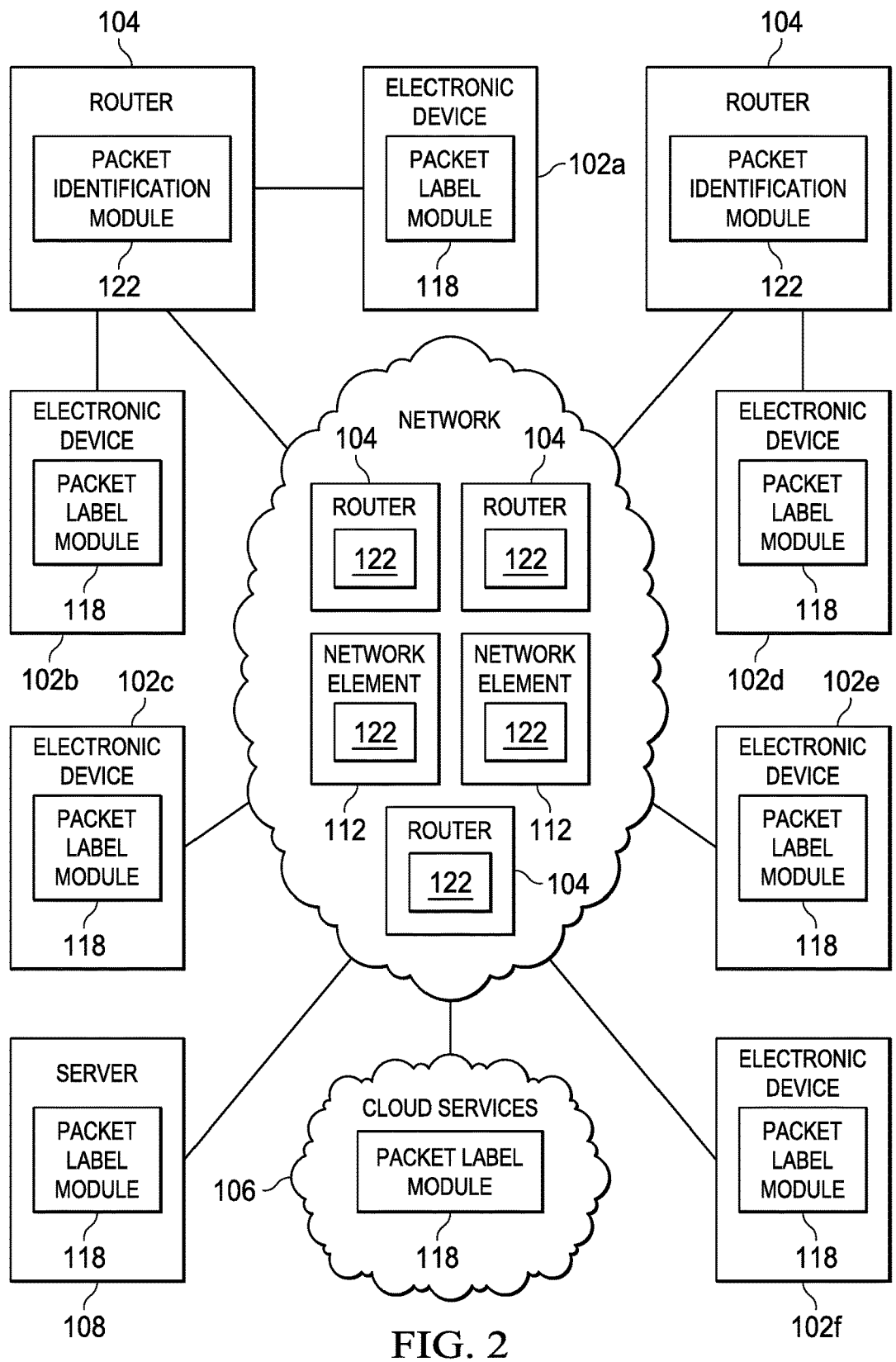
FIG. 2 is another simplified block diagram of a communication system in accordance with one embodiment of the present disclosure.

Turning to FIG. 2, FIG. 2 is a simplified block diagram of a communication system 100 for synonymous labels in accordance with one embodiment of the present disclosure. Communication system 100 can include plurality of electronic devices 102a-102f, one or more routers 104, cloud services 106, and server 108. Each electronic device 102a-102f, cloud services 106, and server 108 can include packet label module 118. Electronic devices 102a-102f, cloud services 106, and server 108 can be in communication using network 110. Network 110 can include one or more routers 104 and/or one or more network elements 112. Each router 104 and network element 112 can include a packet identification module 122.

Communication system 100 can be configured to introduce a synonymous label into a label stack of a packet that uniquely identifies the source of the packet without expanding the stack label. In an example, packet label module 118 can be configured to label or identify specific packets in communication system 100. More specifically, packet label module 118 associated with electronic device 102a can be configured to label or identify specific packets that include the synonymous label from electronic device 102a. In a general example, counter module 120 can be configured to count the specific packets as they traverse through communication system 100. In another general example, packet identification module 122 can be configured to identify the specific packets as they traverse through communication system 100. In some instances, a predetermined action can be performed once the specific packets are identified, such as triggering packet logging, deep packet inspection, or any application where it is desired to trigger some side effect associated with the packet.

In some examples, a synonymous label for specific packets is preceded by a previously-allocated label. This can allow for counting the packets received from a particular source on a multipoint-to-point (MP2P) (or MP2MP) label switched path (LSP) in a multiprotocol label switching (MPLS) system. Further, communication system 100 can be configured to run RFC 6374 ["Packet Loss and Delay Measurement for MPLS Networks", September 2011] with minimum MPLS architecture, protocol, and stack size change in a multi-point to point case, and can allow for the operation of RFC 6374 over user datagram protocol/internet protocol (UDP/IP) without expanding the stack label. Communication system 100 can be configured to include the general case of running generic associated channel (GAL) applications over UDP to allow for a dual IP and IP-free design. Communication system 100 can also be configured to include a network counter (e.g., counter module 120) that is independent of device type, allow for aggregate traffic treatment within SDN, and is independent of a single device. In an example, a third party (e.g. telemetry configuration management) can control reinforcement learning (RL) allocation and its use by forwarding in a manner that is invisible to applications. By not having an original application allocate synonymous labels, third parties (e.g. a network management application) may be in a position to setup distinct labels for the same forward equivalence class (FEC) without requiring a bilateral relationship with every possible application.

For purposes of illustrating certain example techniques of communication system 100, it is important to understand how typical communications may traverse the network. The following foundational information may be viewed as a basis from which the present disclosure may be properly explained.

In MPLS multi-point to point links, packet loss measurement can be relatively difficult. One issue is that in MPLS there is no source address in an MPLS packet, and thus, it can be nearly impossible to count data packets from a particular source. One solution is to have source address labels in MPLS packets. However, such a solution would expand the label stack, which is a problem particularly with low-end platforms and would be a major change in the MPLS architecture. What is needed is a system and method of counting the packets received from a particular source on a MP2P (or MP2MP) LSP in MPLS. It would be beneficial if the system and method did not relate to a counter triggered by some form of deep packet inspection (DPI). In addition, it would be beneficial if RFC6374 could be run between systems that do not understand MPLS GAL because that would require another label in the label stack and could cause a problem on some commodity platforms.

A communication system, as outlined in FIGS. 1 and 2, can resolve these issues (and others). Communication system 100 may be configured to address one or more of the above-mentioned issues by covertly substituting or replacing a label in a stack of a packet to introduce a synonymous label or source label. The synonymous label can uniquely identify a source (e.g., electronic devices 102a-102f, cloud services 106, or server 108). This synonymous label can be preceded by a previously-allocated label.

In view of the limited availability of previously allocated labels, communication system 100 can be configured to use one of the more available previously allocated labels, which means that, in some instances, a total of three label stack entries (LSEs) can be used to convey the identity of the source. In a specific example, communication system 100 can be configured to run RFC6374 with minimum change to MPLS architecture, protocol, and stack size in a MP2P case. Communication system 100 can allow for operation of RFC6374 over UDP/IP. Communication system 100 can also be configured to support RFC6374 in MP2P cases without adding to or increasing the number of previously allocated labels, support MP2P with minimum label stack size, can be introduced without changing any of the existing application protocol code (e.g., can sit under the existing MPLS applications), can be backwards compatible with existing hardware, and can allow systems to run RFC6374 over UDP, meaning a GAL may no longer be needed. Communication system 100 can also be configured for the general case of running GAL applications over UDP allowing dual IP and IP-free design. In one implementation, some metadata can be inserted into RFC6374 packets. The same metadata can carry RFC6374 and the label acquisition protocol over UDP. This allows the measurement protocol to be moved over to IP and not run over the GAL.

In an example, an MPLS application can be set up as normal with labels allocated. Communication system 100 can be configured to acquire or determine a synonymous label that is configured to be synonyms for a previously allocated label. The MPLS application does not or may not know this is happening and this is advantageous because communication system 100 and its teachings can be implemented without re-writing existing MPLS applications. The MPLS source or sender (e.g., electronic devices 102a-102f, cloud services 106, or server 108) can substitute the synonyms label when it wants to achieve a side effect such as incrementing a specific counter, triggering packet logging, DPI, or some other application or action associated with the packet that include the synonymous label. In all other regards (except equal-cost multipath (ECMP) routing the forwarding behavior of a packet with a synonymous label and a previously allocated label is identical or nearly identical to what is currently being implemented. For example, the routing and forwarding behavior of a packet with a synonymous label is the same as a packet without the synonymous label.

In the specific case of RFC6374, to run a packet loss measurement session, a synonymous label can be acquired. The synonymous label can be assigned to packets in a subset of packets traversing the network. As the packets traverse the network, the synonymous label can trigger one or more counters. In an example, the synonymous label only trigger a count at a remote peer and transit routers do not recognize, interpret, or analyze the synonymous label and so no counter is triggered at the transit routers. After a predetermined period of time, the number of packets that traversed the network can be determined and compared with the total number of packets with the synonymous label that were sent.

Turning to the infrastructure of FIGS. 1 and 2, communication system 100 in accordance with an example embodiment is shown. Generally, communication system 100 can be implemented in any type of network and any network topology. Network 110 represents a series of points or nodes of interconnected communication paths for receiving and transmitting packets of information that propagate through communication system 100. Network 110 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 110 can include any number of hardware or software elements coupled to (and in communication with) each other through a communications medium.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102*a*-102*f*, router 104, cloud services 106, server 108, and network element 112, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for the effective exchange of data or information.

In one implementation, network elements implementing synonymous label features described herein may include software to achieve (or to foster) the functions discussed herein for providing and processing synonymous labels when the software is executed on one or more processors to carry out the functions. This could include the implementation of instances of modules and/or any other suitable element that would foster the activities discussed herein. Additionally, each of these elements can have an internal structure (e.g., a processor, a memory element, etc.) to facilitate some of the operations described herein. In other embodiments, these functions for synonymous labels may be executed externally to these elements, or included in some other network element to achieve the intended functionality. Alternatively, network elements may include software (or reciprocating software) that can coordinate with other network elements in order to achieve the synonymous label functions described herein. In still other embodiments, one or several devices may include any suitable algorithms, hardware, software, components, modules, interfaces, or objects that facilitate the operations thereof.

In regards to the internal structure associated with communication system 100, electronic devices 102*a*-102*f*, router 104, cloud services 106, server 108, and network element 112 can include memory elements for storing information to be used in the operations outlined herein. Electronic devices 102*a*-102*f*, router 104, cloud services 106, server 108, and network element 112 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the synonymous label functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described in this Specification. The memory element is further configured to store data such as packet counts, synonymous labels, databases associating synonymous labels and data, etc. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving synonymous labels, as outlined herein. Additionally, each of these devices may include a processor that can execute software or an algorithm to perform the synonymous labels activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In an example implementation, network elements of communication system 100, such as electronic devices 102a-102f, router 104, cloud services 106, server 108, and network element 112 may include software modules (e.g., packet label module 118, counter module 120, and packet identification module 122) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic devices 102a-102f, router 104, cloud services 106, server 108, and network elements 112 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102a-102f can each be a network element and include, for example, desktop computers, servers, workstations, laptop computers, mobile devices, personal digital assistants, smartphones, tablets, or other similar devices. Cloud services 106 is configured to provide cloud services to electronic devices 102a-102f. Cloud services may generally be defined as the use of computing resources that are delivered as a service over a network, such as the Internet. The services may be distributed and separated to provide required support for electronic devices 102a-102f, cloud services 106, and server 108. Typically, compute, storage, and network resources are offered in a cloud infrastructure, effectively shifting the workload from a local network to the cloud network. Server 108 can be a network element such as a server or virtual server and can be associated with clients, customers, endpoints, or end users wishing to initiate a communication in communication system 100 via some network (e.g., network 110). The term 'server' is inclusive of devices used to serve the requests of clients and/or perform some computational task on behalf of clients within communication systems 100. Although packet label module 118, counter module 120, and packet identification module 122 are represented in FIGS. 1 and 2 as being located in electronic devices 102a-102f, cloud services 106, and server 108 respectively, this is for illustrative purposes only.

Figure 3:
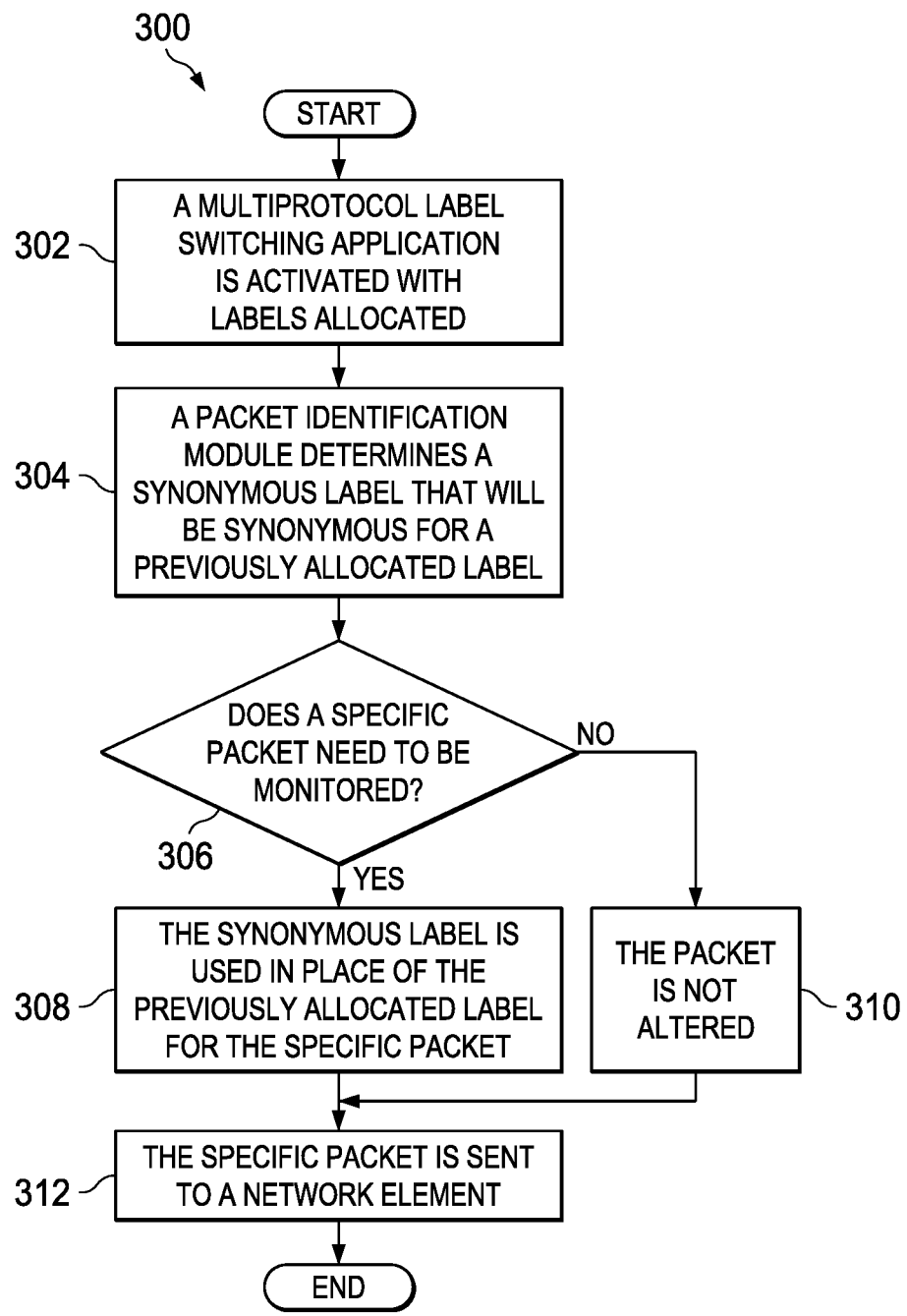
FIG. 3 is a simplified flowchart illustrating potential operations associated with the communication system.

Turning to FIG. 3, FIG. 3 is a simplified flowchart 300 illustrating one potential operation associated with the present disclosure. At 302, a multiprotocol label switching application is activated with labels allocated. At 304, a packet identification module determines a synonymous label that will be synonymous for a previously allocated label. At 306, the system determines if a specific packet needs to be monitored. For example, the specific packet may be part of a subset of packets to be monitored. If the specific packet does need to be monitored, then the synonymous label is used in place of the previously allocated label for the specific packet, as in 308. If the specific packet does not need to be monitored, then the packet is not altered, as in 310. At 312, the specific packet is sent to a network element.

Figure 4:
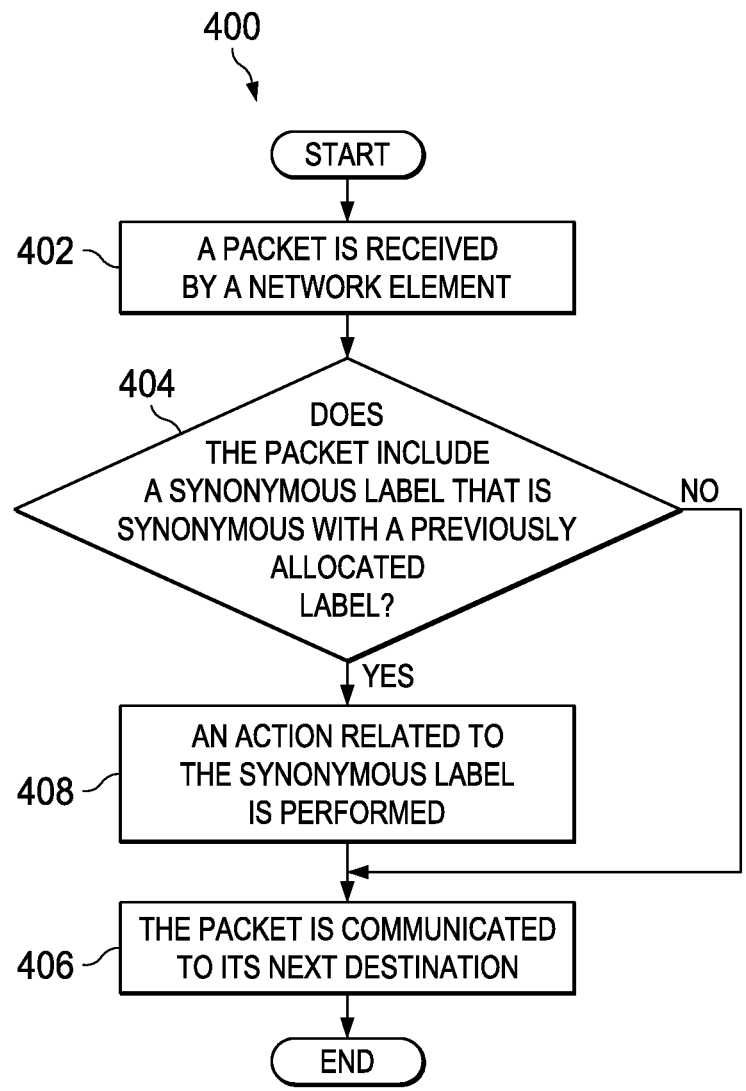
FIG. 4 is a simplified flowchart illustrating potential operations associated with the communication system.

Turning to FIG. 4, FIG. 4 is a simplified flowchart 400 illustrating one potential operation associated with the present disclosure. At 402, a packet is received by a network element. At 404, the system determines if the packet includes a synonymous label that is synonymous with a previously allocated label. If the packet does include a synonymous label, then an action related to the synonymous label is performed, as in 408. For example, a counter may be incremented, packet logging may be triggered, DPI may be triggered, or some other application or action related to the packet with the synonymous label may be performed. At 406, the packet is communicated to its next destination. In an example, the packet may be forwarded, received and modified, or otherwise processed normally. If the packet does not include a synonymous label, then no action is taken and the packet is communicated to its next destination, as in 406. It is worth noting that a packet with the synonymous label is communicated to the next destination the same as if the packed included the previously allocated label.

Figure 5:
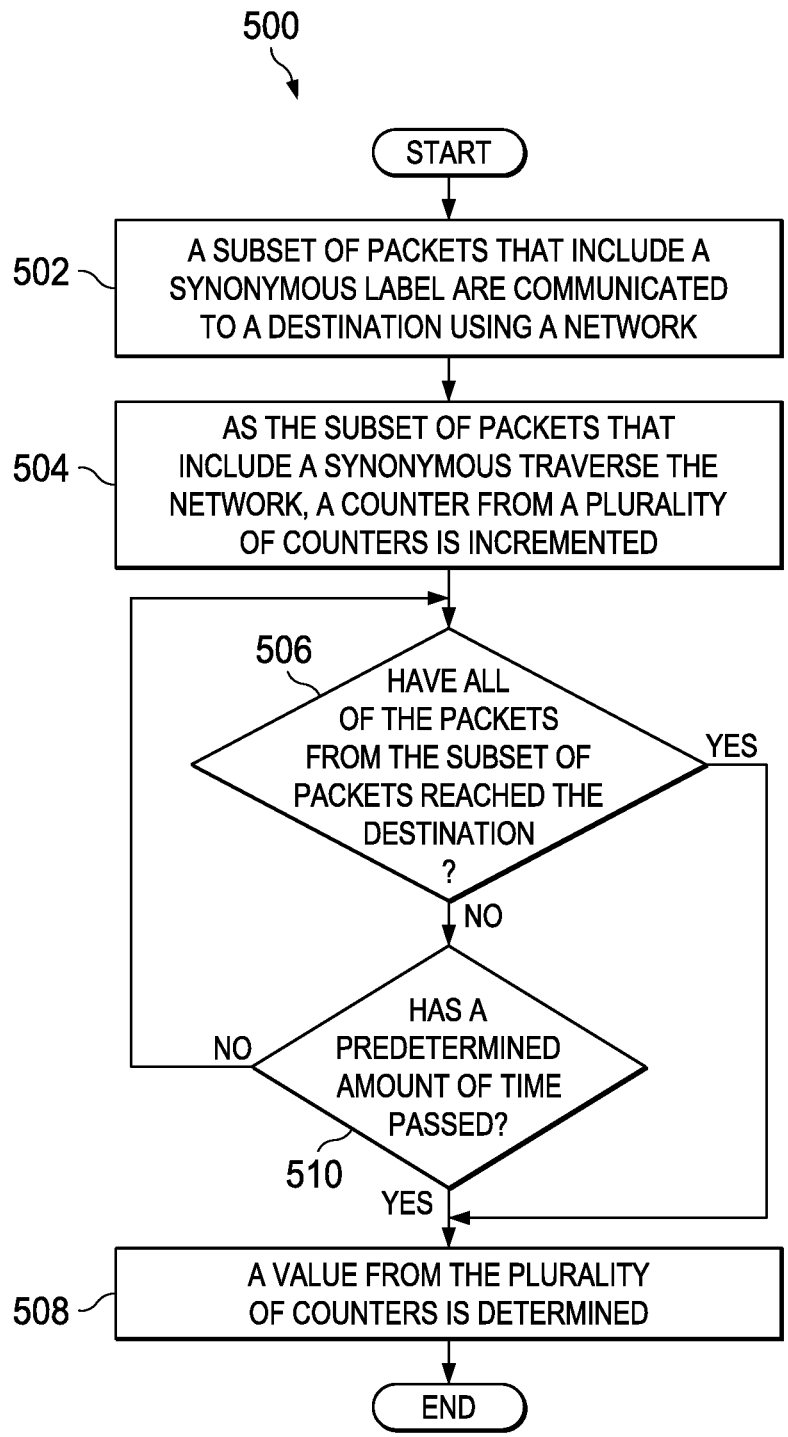
FIG. 5 is a simplified flowchart illustrating potential operations associated with the communication system.

Turning to FIG. 5, FIG. 5 is a simplified flowchart 500 illustrating one potential operation associated with the present disclosure. At 502, a subset of packets that include a synonymous label are communicated to a destination through a network. At 504, as the subset of packets traverse the network, a counter from a plurality of counters is incremented. For example, counter module 120 may count or otherwise increment a counter for each packet that includes the synonymous label and traverses through the network element that includes counter module 120. At 506, the system determines if all of the packets from the subset of packets reached the destination. If all of the packets of the package have reached the destination, then a value from the plurality of counters is determined, as in 508. If all of the packets of the package have not reached the destination, then the system determines if a predetermined amount of time has passed, as in 510. If the predetermined amount of time has not passed, then the system returns to 506 and the system determines if all of the packets of the package reached the destination. If the predetermined amount of time has passed, then a value from the plurality of counters is determined, as in 508. The predetermined amount of time is used to account for lost packets and other instances where not all of the packets of the package would reach the destination. In an example, counter module 120 can operate as a counter. In an example, the system does not determine if all of the packets have reached the destination and determined the value from the plurality of counters after a predetermined amount of time or some other predetermined condition (e.g., upon the occurrence of an event or events).

Figure 6:
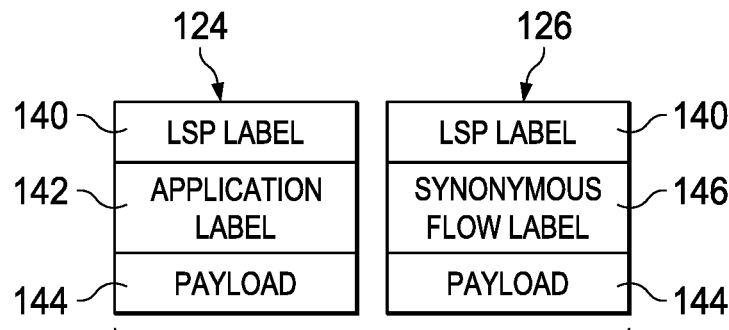
FIG. 6 is another simplified block diagram illustrating possible example details associated with the communication system in accordance with one embodiment of the present disclosure.

Turning to FIG. 6, FIG. 6 is a simplified block diagram of a stack label of a packet used in communication system 100 in accordance with one embodiment of the present disclosure. As illustrated in FIG. 6, an unaltered stack label 124 can include a label switched path (LSP) label 140, an application label 142 (e.g. a previously allocated label), and a payload 144. Unaltered stack label 124 can be modified to create a modified stack label 126. Modified stack label 126 can include LSP label 140, a synonymous flow label (SFL) 146 (e.g. a synonymous label), and payload 144. FIG. 6 illustrates an example where both an LSP label 140 and an application label 142 are present in the label stack. In an example, uninstrumented traffic (e.g., packages or packets that are not being tracked or monitored) include unaltered stack label 124. Instrumented flows (e.g., packages or packets that are being tracked or monitored) include modified stack label 126 with SFL 146 used to indicate the packet batch. SFL 146 can function as a special label to identify the packet. At the egress of a network element, LSP label 140 (if present) can be popped and SFL 146 can be processed in the same way as the corresponding application label (e.g., application label 142) would have been processed. In an example, SFL 146 can be used to support RFC6374 packet loss measurements where the total number of packets received with a particular SFL 146 are recorded.

Figure 7:
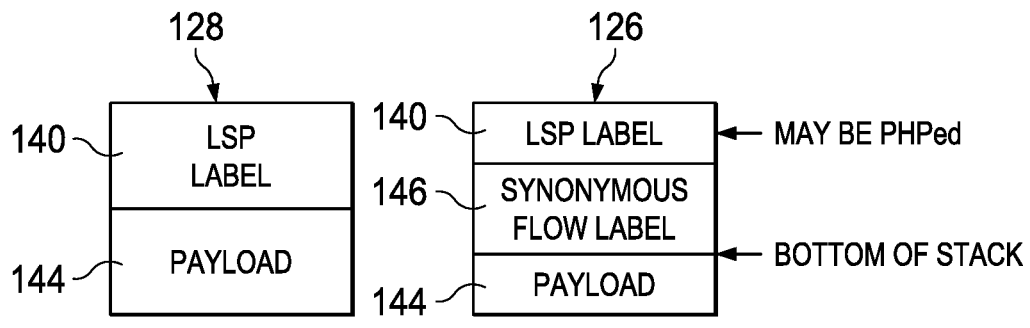
FIG. 7 is another simplified block diagram illustrating possible example details associated with the communication system in accordance with one embodiment of the present disclosure.

Turning to FIG. 7, FIG. 7 is a simplified block diagram of a label stack of a packet used in communication system 100 in accordance with one embodiment of the present disclosure. FIG. 7 illustrates an example where only an LSP label is present in an unaltered LSP free stack label 128. Uninstrumented traffic includes the "normal" stack and instrumented traffic includes SFL 146 with SFL 146 being used to identify the packet and trigger an action. However, in this case it is necessary for the ingress LSR to first push SFL 146 and then to push LSP label 140.

At the receiving router or network element, LSP label 140 may still be present or LSP label 140 may have been penultimate hop popped. If LSP label 140 is present, the packet is processed exactly as it would normally be processed and then it is popped. This reveals SFL 146, which in the case of RFC6374 measurements is simply counted and can be discarded. In this respect the only process that happens is the agreed SFL processing and then the SFL is popped or otherwise discarded. As SFL 146 is near the bottom of stack, the IP packet that follows is processed as normal.

If LSP label 140 is not present, for example, due to PHP action in the upstream router or network element, two almost equivalent processing actions can take place. Either SFL 146 can be treated as an LSP label that was not PHPed and then an additional associated SFL action is taken, which can include packet batch counting, or it can be treated as an explicit NULL with associated SFL actions. From the perspective of the system, the behavior of the two approaches is indistinguishable and thus either may be implemented.

Figure 8:
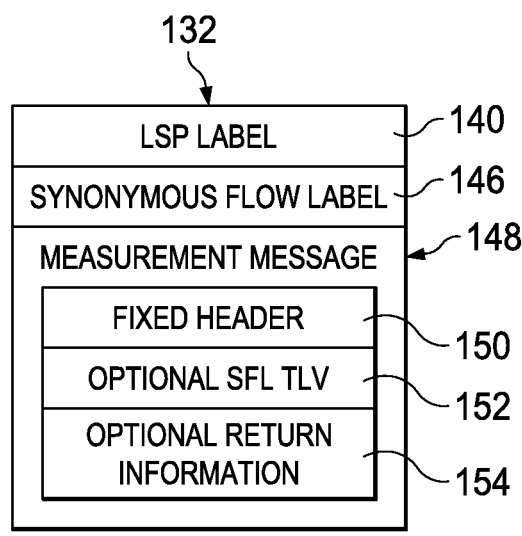
FIG. 8 is another simplified block diagram illustrating possible example details associated with the communication system in accordance with one embodiment of the present disclosure.

Turning to FIG. 8, FIG. 8 is a simplified block diagram of a label stack of a packet used in communication system 100 in accordance with one embodiment of the present disclosure. As illustrated in FIG. 8, a query message 132 using SFL 146 is shown. Query message 132 can include LSP label 140, SFL label 146, and a measurement message 148. In a specific example, measurement message 148 may be an RFC6374 measurement message. Measurement message 148 can include a fixed header 150, optional SFL TLV 152, and optional return information 154. In a specific example, fixed header 150 can be an RFC6374 fixed header.

The MPLS label stack is the same as that used for the user data service packets being instrumented. The RFC6374 message can include an RFC6374 fixed header (as specified in RFC6374) carried over an ACH channel type specified by type of measurement being made (e.g., loss, delay, or loss and delay). Two optional TLVs MAY also be carried if needed. The first is the SFL TLV (specified in Section 5.1 of RFC6374). This is used to provide the implementation with a reminder of the SFL that was used to carry the RFC6374 message. This is needed because a number of MPLS implementations do not provide the MPLS label stack to the MPLS OAM handler. The TLV is required if RFC6374 messages are sent over UDP and should be included unless it is known that the information is not needed by a RFC6374 responder.

The second set of information that may be needed is the return information that allows a responder or source that allocated the synonymous label to send the RFC6374 response to a querier or destination that requested the use of the synonymous label. This is not needed if the response is requested in-band and the MPLS construct being measured is a point-to-point LSP. The return address TLV is defined in RFC6378. As used throughout, the terms "responder" and "source" can include any element such as electronic devices 102*a-f*, could services 106, server 108, etc. that replaces a previously allocated label with a synonymous label. The terms "querier" and "destination" can include any element such as electronic devices 102*a-f*, could services 106, server 108, etc. that requested the use of the synonymous label. In some examples, the responder and the querier can be the same element or device.

Figure 9:
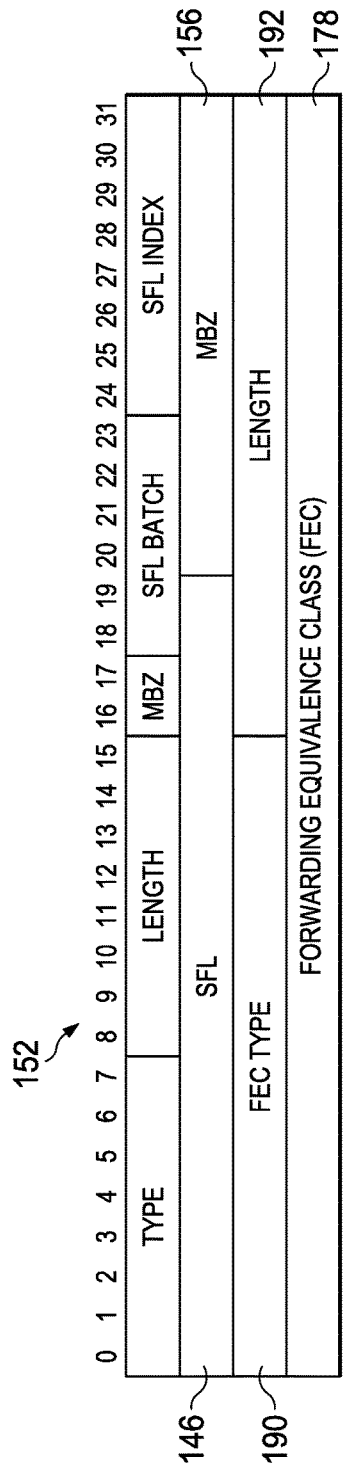
FIG. 9 is another simplified block diagram illustrating possible example details associated with the communication system in accordance with one embodiment of the present disclosure.

Turning to FIG. 9, FIG. 9 is a simplified block diagram of an example SFL TLV 152 that may be used in communication system 100 in accordance with one embodiment of the present disclosure. As illustrated in FIG. 9, SFL TLV 152 can include SFL 146, must be zero (MBZ) field 156, FEC 190, length 192, and FEC field 178, or some compressed version of the format with equivalent semantics. SFL 146 is the SFL that was carried in the label stack and was used to allocate the SFL and the index into the batch of SFLs that were allocated for FEC 190. MBZ field 156 is unused spaced and can be made available for use at a later date. In one example using the protocol defined in RFC 6374, MBZ field 156 is set to zero by the sender and is ignored by the receiver. FEC 190 is the numeric value of the subtype as defined in the Sub-TLVs for TLV Types 1, 16, and 21. Length 192 can be as defined in Section 3 of RFC 4379 for Sub-types. FEC 190 can be as defined by the corresponding FEC definition for the FEC type. FEC 190 corresponds to SFL 146 and can be used to request SFL 146. FEC 190 can also be used to allow for operation with hardware that discards the MPLS label stack before passing the remainder of the stack to the OAM handler. By providing both SFL 146 and FEC 190 plus index into the array of allocated SFLs, a number of implementation types can be supported.

Figure 10:
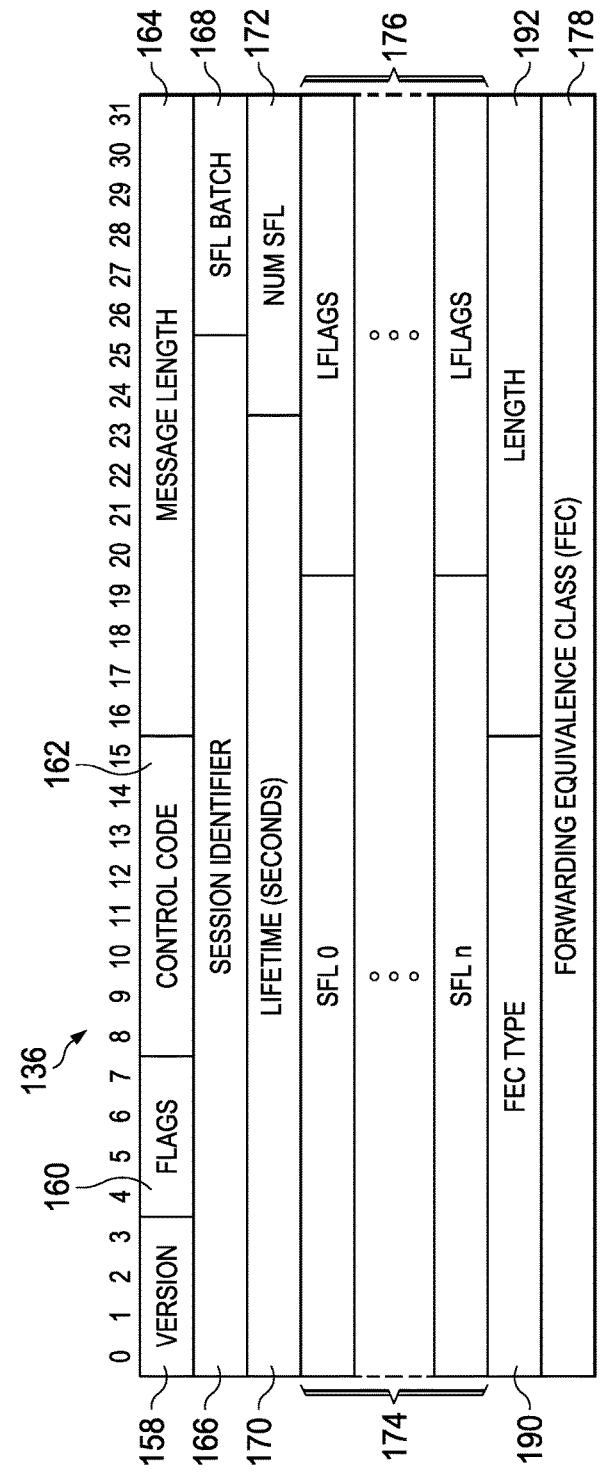
FIG. 10 is another simplified block diagram illustrating possible example details associated with the communication system in accordance with one embodiment of the present disclosure.

Turning to FIG. 10, FIG. 10 is a simplified block diagram of an example SFL control message 136 that may be used in communication system 100 in accordance with one embodiment of the present disclosure. As illustrated in FIG. 10, SFL control message 136 can include a version field 158, a flag field 160, a control code field 162, a message length field 164, a session identifier 166, an SFL batch field 168, a lifetime field 170, a number SFL field 172, one or more SFL 'n' fields 174, one or more flags 176, FEC 190, length 192, and FEC field 178, or some compressed version of the format with equivalent semantics.

Version field 158 can include a protocol version for the packet. In this example, the version is set to zero. Flag field 160 can include message control flags. Control code field 162 can include code identifying a query or response type message. Message length field 164 can include a length of the message in bytes. Session identifier 166 can be set arbitrarily by the querier and can be used as a message handle. SFL batch field 168 can be used where the SFLs for session identifier 166 can be managed across multiple SFL control messages. For example, a given set of SFLs should be retained in the same batch.

Lifetime field 170 can include a representation of a lifetime in seconds of the SFLs in the message. In a query message, lifetime field 170 includes a requested lifetime. In a response message, lifetime field 170 is the lifetime that the SFLs have been allocated for by a responder. In an example, the querier is not allowed to use an SFL after expiry of its lifetime and a responder should make the SFL available for at least its life-time.

The lifetime of SFLs is expected to be sufficiently long so that there are no significant constraints on timer accuracy. A querier can be configured to stop using a SFL significantly before the expiry of its lifetime and a responder can be configured to maintain an SFL in active operation significantly beyond nominal expiry. In an example, a margin in the order of minutes can be used.

Number SFL field 172 can include a representation of a number of SFLs in an SFL batch. The number of SFLs in an SFL batch should be constant for the lifetime of the batch. In a specific example, the n'th or last SFL in one or more SFL 'n' fields 174 includes an MPLS label that can be a component of a label stack entry (e.g., as defined in Section 2.1 of RFC3032). The position of a label in one or more SFL 'n' fields 174 is consistent for the lifetime represented in lifetime field 170. Each flag in one or more flags 176 can be associated with the immediately preceding SFL from one or more SFL 'n' fields 174. FEC field 178 can include a FEC that corresponds to each SFL from one or more SFL 'n' fields 174.

In an example, to request a batch of SFLs, a querier constructs an SFL control request, encapsulates the control request in an SFL control ACH, and sends it to a responder. The querier sets the control message flag to query and the control code to request. The querier chooses a session identifier as a handle for the transaction and as a way of binding this batch of SFLs to other operations that will use members of the SFL batch. Since members of the batch are treated as a group, an SFL batch identifier can be used to identify different SFL batches used in conjunction with the same session identifier. The requested lifetime is set and represents the number of seconds from the time of the query to the time when the batch of SFLs will expire unless refreshed.

Num SFL field 172 is set to the SFL batch size. If a specific value is requested (for example for continuity across system restarts) the requested value can be written into the SFV 'n' field 174 and flag 176 is set. Otherwise, and including spare SFLs where an allocation is not requested, version field 158 is set to zero and flag 176 is cleared. For each SFL entry where an allocation is requested, a corresponding flag 176 is set. All other flags can be cleared. The FEC is set to the FEC for which the SFLs are requested.

A responder can set the control message flag to response and initially set the control code to grant. For each SFL with an R flag set, the responder can determine whether it can honor the request. If the responder can honor the request, the responder can set the A L-Flag. If the SFL value in the query was zero it overwrites it with the allocated SFL label value. In all other cases the responder may leave the SFL value and flag 176 unchanged. Lifetime field 170 is updated with the lifetime of the SFLs if this is different from the requested lifetime. All other fields in the query message are left unchanged and the message is sent back to the querier using the signaled or previously agreed message path. Where the offered lifetime is other than the requested lifetime, the querier may accept the proposed value, or withdraw the SFLs and attempt to negotiate a new set of SFLs with a different lifetime. If the responder is unable to allocate all of the requested SFLs, it can respond with a response code of SFL-Unable. The querier can determine whether the allocated SFLs were adequate for its purposes and can send a withdraw command if the allocated SFLS are not adequate.

A querier can wait a configured time (e.g., 60 seconds) before reattempting negotiation for a resource. Any failure to negotiate the required resources can be notified through the management interface of both the querier and responder. A querier does not need to send an expired SFL to a responder since to do so may invalidate another SFL operation.

Figure 11:
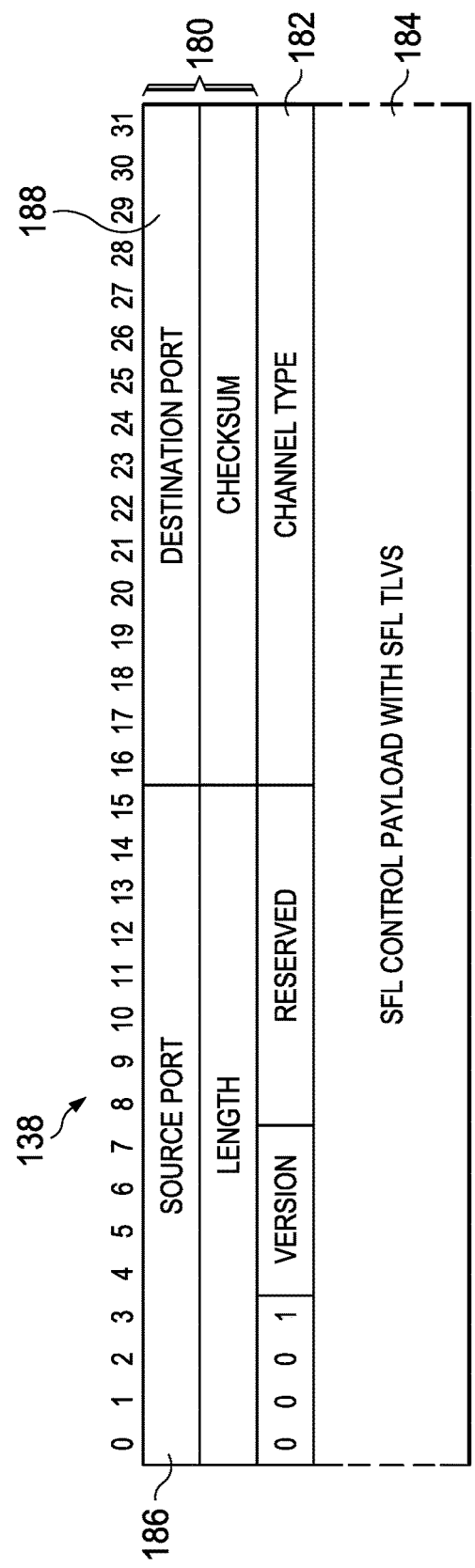
FIG. 11 is another simplified block diagram illustrating possible example details associated with the communication system in accordance with one embodiment of the present disclosure.

Turning to FIG. 11, FIG. 11 is a simplified block diagram of an example protocol stack 138 that may be used in communication system 100 in accordance with one embodiment of the present disclosure. As illustrated in FIG. 11, protocol stack 138 can include a UDP header 180, an ACH 182, and a message field 184. UDP header 180 can include a source port 186 and a destination port 188. In an example, source port 186 can be used by the responder to direct responses to the correct query process on the querier. Destination port 188 can be used by the querier to direct the message to the correct process on the responder. Message field 184 can include an SFL control payload with SLF TLVs.

Note that in certain example implementations, the synonymous label functions outlined herein may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element can store data used for the operations described herein. This includes the memory element being able to store code (e.g., software, logic, processor instructions, etc.) that can be executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagram (i.e., FIGS. 3-5) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   at an electronic device in a system including routers to forward network traffic originated at the electronic device through a network using label switched path forwarding, wherein the network traffic includes packets, at least a portion of the packets include a stack, and each stack includes one or more previously allocated labels used for the label switched path forwarding:
   sending to a responder in the network a first control message including a field set to indicate that the control message is a request for synonymous labels used to trigger actions in the routers to implement monitoring of the network traffic, the first control message further including a requested lifetime for the synonymous labels;
   receiving from the responder in response to the request a second control message including a field set to indicate the second control message is a response to the request, synonymous labels allocated by the responder, and a lifetime over which the synonymous labels are able to be used, and after which the synonymous labels are not allowed to be used;
   determining whether a specific packet of the network traffic is to be monitored in the network;

if the specific packet is to be monitored:
   determining a synonymous label among the synonymous labels that triggers an action in the routers to implement the monitoring; and
   replacing a label among the one or more previously allocated labels in the stack of the specific packet with the synonymous label as determined; and
if the specific packet is not to be monitored, not replacing the label.

2. The method of claim 1, wherein each control message further indicates a session identifier.

3. The method of claim 2, wherein each control message further indicates a protocol version.

4. The method of claim 1, wherein the synonymous label identifies a source of the specific packet.

5. The method of claim 1, further comprising:
determining packet loss related to a subset of packets in the network traffic, wherein each packet in the subset of packets includes the synonymous label.

6. The method of claim 5, wherein the packet loss is determined using RFC 6374 procedures and protocol mechanisms.

7. The method of claim 1, further comprising:
examining at least a portion of the network traffic that includes the packets to identify the synonymous label.

8. Logic encoded in one or more non-transitory tangible media that includes code for execution and when executed by a processor of an electronic device in a system including routers to forward network traffic originated at the electronic device through a network using label switched path forwarding, wherein the network traffic includes packets, at least a portion of the packets include a stack, and at least a portion of each stack includes one or more previously allocated labels used for the label switched path forwarding, the logic operable to perform operations comprising:
   sending to a responder in the network a first control message including a field set to indicate that the control message is a request for synonymous labels used to trigger actions in the routers to implement monitoring of the network traffic, the first control message further including a requested lifetime for the synonymous labels;
   receiving from the responder in response to the request a second control message including a field set to indicate the second control message is a response to the request, synonymous labels allocated by the responder, and a lifetime over which the synonymous labels are able to be used, and after which the synonymous labels are not allowed to be used;
   determining whether a specific packet of the network traffic is to be monitored in the network;
   if the specific packet is to be monitored:
      determining a synonymous label among the synonymous labels that triggers an action in the routers to implement the monitoring; and
      replacing a label among the one or more previously allocated labels in the stack of the specific packet with the synonymous label as determined; and
   if the specific packet is not to be monitored, not replacing the label.

9. The logic of claim 8, wherein the stack is not further modified.

10. The logic of claim 8, wherein the synonymous label identifies a subset of packets in the network traffic.

11. The logic of claim 8, wherein the synonymous label identifies a source of the specific packet.

12. The logic of claim 11, further comprising:
determining packet loss related to a subset of packets in the network traffic, wherein each packet in the subset of packets includes the synonymous label.

13. The logic of claim 12, wherein the packet loss is determined using RFC 6374 procedures and protocol mechanisms.

14. An apparatus, comprising:
a memory element configured to store data,
a processor operable to execute instructions associated with the data, and
configured to:
   originate network traffic in a system including routers to forward the network traffic through a network using label switched path forwarding, wherein the network traffic includes packets, at least a portion of the packets include a stack, and each stack includes one or more previously allocated labels used for the label switched path forwarding;
   send to a responder in the network a first control message including a field set to indicate that the control message is a request for synonymous labels used to trigger actions in the routers to implement monitoring of the network traffic, the first control message further including a requested lifetime for the synonymous labels;
   receive from the responder in response to the request a second control message including a field set to indicate the second control message is a response to the request, synonymous labels allocated by the responder, and a lifetime over which the synonymous labels are able to be used, and after which the synonymous labels are not allowed to be used;
   determine whether a specific packet of the network traffic is to be monitored in the network;
   if the specific packet is to be monitored:
      determine a synonymous label among the synonymous labels that triggers an action in the routers to implement the monitoring; and
      replace a label among the one or more previously allocated labels in the stack of the specific packet with the synonymous label as determined; and
   if the specific packet is not to be monitored, not replace the label.

15. The apparatus of claim 14, wherein the stack is not further modified.

16. The apparatus of claim 14, wherein the synonymous label identifies a subset of packets in the network traffic.

17. The apparatus of claim 14, wherein the processor is further configured to:
determine packet loss related to a subset of packets in the network traffic, wherein each packet in the subset of packets includes the synonymous label.

18. The apparatus of claim 17, wherein the packet loss is determined using RFC 6374 procedures and protocol mechanisms.

19. The apparatus of claim 14, wherein the processor is further configured to:
replace a label from the one of the one or more previously allocated labels of a plurality of specific packets with the synonymous label.

20. The apparatus of claim 14, wherein each control message further indicates a session identifier.

* * * * *